July 28, 1959     A. C. PHILLIPS ET AL     2,896,447
SPRING SUSPENSION DEVICES
Filed Nov. 21, 1955

A. C. PHILLIPS &
R. V. MYERS
*INVENTORS*

BY *Moore & Hall*

ATTORNEYS

United States Patent Office 2,896,447
Patented July 28, 1959

2,896,447

SPRING SUSPENSION DEVICES

Arthur C. Phillips and Reginald V. Myers, Hillington, Glasgow, Scotland, assignors to Kelvin & Hughes Limited, Glasgow, Scotland Application November 21, 1955, Serial No. 548,175

Claims priority, application Great Britain November 23, 1954

5 Claims. (Cl. 73—71)

This invention relates to a leaf spring suspension device in which one or more springs each mounted at one end carry a weight.

The object of the present invention is to provide means whereby the natural frequency of vibration of the suspension can be varied.

According to the invention the device comprises a spring in the form of a spoked wheel or spider having one or more radial arms fixed at their outer ends and carrying a weight, and a rotary member having parts engaging the arms of the spider over areas which vary according to the rotary position of said member in relation to the spring.

Figure 1:
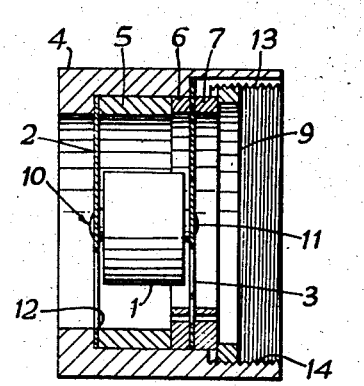
Figure 2:
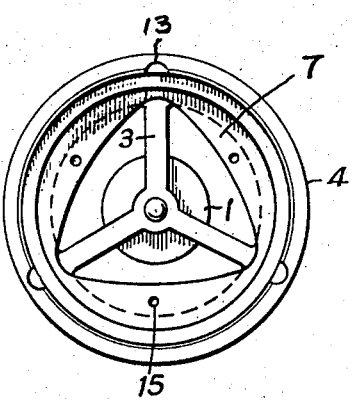

In order that the invention may be clearly understood the same will be more fully described by way of example with reference to the accompanying drawing in which:

Figure 1 is a side elevation of a device made in accordance with the invention; and Figure 2 is a plan view thereof.

A cylindrical weight 1 is provided with two identical projections 10 and 11 one at each end of the weight which engage in holes in a pair of leaf springs which take the form of axially aligned spoked wheels or spiders 2 and 3. These spiders 2 and 3 each have three arms or leaf springs spaced 120° apart. The first three armed spider 2 engages at the outer ends of its arms against an annular shoulder 12 formed internally of a sleeve 4 which constitutes the main casing or body of the device. A spacer ring 5 engages peripherally within the sleeve 4 with one end against the outer ends of the arms of the spider 2 to hold the spider against the shoulder 12. The device also comprises a rotary member in the form of two cam rings 6 and 7 the first of which engages axially with the other end of the spacer ring 5 and peripherally within the sleeve 4. These two cam rings 6 and 7 are identical with each other each having a circular outer periphery and an inner periphery which is in plan view approximately in the form of an equilateral triangle the sides of which gently curve and blend into one another at the corners.

The arms of the second spider 3 engage in slots 13 in the sleeve 4 which are spaced 120° apart. The sleeve 4 has an internal screw thread 14. The slots 13 are of such a length that when the components are assembled the arms of the spider 3 engage axially against the cam ring 6 and not against the ends of the slots 13. One side of the arms of the spider 3 engages axially with the cam ring 6 and the other side is engaged by the cam ring 7 which is also peripherally engaged within the sleeve 4. A clamp ring 9 screws into the thread 14 within the sleeve 4 and engages against the cam ring 7 and clamps the whole assembly together. The cam rings 6 and 7 are connected together by three pins 15 in corresponding positions.

Rotation of the cam rings within the sleeve 4 relative to the spider 3 shortens the effective lengths of the leaf spring arms of the spider and thereby alters the natural frequency of the system.

The invention in the form shown in the drawing lends itself to electric motor control, can be used as a vibration test unit, in conjunction with a single phase generator for engine control systems, accelerometers and tunable suspensions generally. These applications are presented as representative and are not intended to be limiting.

While there has been described above what is at present believed to be the preferred form of the invention, it will be understood that various changes may be made therein by those skilled in the art without departing from the spirit of the invention. All such variations which fall within the true spirit of the invention are intended to be included in the appended claims in which generic terms have been employed to include all such variations and equivalent structures.

We claim:

1. A spring suspension device comprising a body having a cylindrical bore, a leaf spring located in said bore having at least one arm, two rotatably adjustable abutment members also located in said bore, said abutment members having abutment surfaces engaging opposite surfaces of said arm, said abutment surfaces having edges effective to determine the effective length of said arm, said effective edges being maintained in constant alignment with each other and being adjustable along the length of the arm according to the rotary position of said abutment members in relation to said spring to vary the effective length of the arm, and retaining means for retaining the abutment members in said body.

2. A spring suspension device comprising a body having a cylindrical bore, a leaf spring located in said bore having a plurality of arms disposed radially of said bore, two rotatably adjustable abutment members also located in said bore, coaxial with and rotatable on the axis of said bore, said abutment members having abutment surfaces engaging opposite surfaces of said arms and shaped at an angle to the radial direction, said abutment surfaces having edges effective to determine the effective length of the arms, said effective edges of one abutment member being maintained in constant alignment with the effective edges of the other abutment member, said effective edges being adjustable along the length of the arms according to the rotary position of the abutment members in relation to the spring, and retaining means for retaining the abutment members in the body.

3. A spring suspension device comprising a hollow, cylindrical body, a leaf spring located in said body having three arms spaced 120° from each other and disposed radially of said body, two simultaneously rotatable adjustable abutment members also located in said body positioned one on either side of the spring, and retaining means for retaining the abutment members in the body, said abutment members being formed with circular outer peripheries and inner peripheries which are substantially equilateral triangles with slightly concave inner edges curving into each other at the corners of the triangles, said abutment members having abutment surfaces engaging opposite surfaces of the arms, which abutment surfaces have edges formed by said inner peripheries which engage the sides of the arms at the outer ends thereof to determine the effective lengths of the arms, said abutment members being pinned together so that inner peripheries thereof are in constant alignment with each other, and the edges formed by the inner peripheries being adjustable along the lengths of the arms according to the rotary position of the abutment members in relation to the spring.

4. A spring suspension device according to claim 3, which includes a weight carried at the center of the spring.

5. A spring suspension device comprising a body having a cylindrical bore and a shoulder within the body at one end thereof; a first leaf spring located in said bore having at least one arm, a collar fitting closely within said bore engaging the arm of said spring to hold it firmly against said shoulder, a second leaf spring located in said bore having at least one arm, two rotatably adjustable abutment members also located in said bore and coaxial therewith, one of which abutment members engaging said collar, said abutment members having abutment surfaces engaging opposite surfaces of said latter arm, said abutment surfaces having edges effective to determine the effective length of said latter arm, said effective edges being maintained in constant alignment with each other and being adjustable along the length of the latter arm according to the rotary position of said abutment members in relation to said spring to vary the effective length of the latter arm, retaining means for retaining the abutment members in said body, and a weight carried between the centers of said first and second leaf springs.

References Cited in the file of this patent

UNITED STATES PATENTS

| | | |
|---|---|---|
| 2,407,757 | MacCallum | Sept. 17, 1946 |
| 2,689,723 | Von Basel | Sept. 21, 1954 |

FOREIGN PATENTS

| | | |
|---|---|---|
| 617,076 | Great Britain | Feb. 1, 1949 |
| 878,132 | Germany | June 1, 1953 |